(12) United States Patent
Urayama et al.

(10) Patent No.: US 7,796,741 B2
(45) Date of Patent: Sep. 14, 2010

(54) CALL CONNECTION CONTROL UNIT AND CALL CONNECTION CONTROL METHOD

(75) Inventors: Fumio Urayama, Koriyama (JP); Tatsuya Yoshida, Koriyama (JP); Shinji Saitou, Koriyama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 488 days.

(21) Appl. No.: 11/516,606

(22) Filed: Sep. 7, 2006

(65) Prior Publication Data

US 2007/0121827 A1 May 31, 2007

(30) Foreign Application Priority Data

Sep. 7, 2005 (JP) ............................. 2005-259745

(51) Int. Cl.
*H04M 3/42* (2006.01)
(52) U.S. Cl. .................................. 379/201.01; 370/352
(58) Field of Classification Search ............ 379/201.01, 379/93.23, 216.01; 370/352
See application file for complete search history.

(56) References Cited

U.S. PATENT DOCUMENTS

| | | | | |
|---|---|---|---|---|
| 6,091,808 A | * | 7/2000 | Wood et al. ............. | 379/201.04 |
| 6,674,745 B1 | * | 1/2004 | Schuster et al. ............. | 370/352 |
| 7,177,415 B1 | * | 2/2007 | Kim et al. ............. | 379/216.01 |
| 2004/0081304 A1 | * | 4/2004 | Lee ......................... | 379/207.04 |
| 2005/0068942 A1 | * | 3/2005 | Chu et al. ................. | 370/352 |
| 2006/0190623 A1 | * | 8/2006 | Stahura ..................... | 709/245 |
| 2007/0297393 A1 | * | 12/2007 | Furukawa et al. ............ | 370/352 |

FOREIGN PATENT DOCUMENTS

| | | |
|---|---|---|
| JP | 2001-127902 | 5/2001 |
| JP | 2004-229151 | 8/2004 |

* cited by examiner

*Primary Examiner*—William J Deane
(74) *Attorney, Agent, or Firm*—Antonelli, Terry, Stout & Kraus, LLP.

(57) ABSTRACT

The invention provides a call connection control method which can use a conventional telephone as-is and performing linking with a low possibility of mistaking telephones, and a call connection control unit for implementing the method. Upon receiving an outgoing call request from an outgoing-call side personal computer (PC), a call connection control unit retrieves an outgoing-call side IP-telephone linked to the PC, and transmits an incoming call request to the IP-telephone. Upon receiving the incoming call request, the IP-telephone rings. When the caller places the IP-telephone that rings in a starting (off-hook) state, the call connection control unit sends a ring back tone to the IP-telephone and transmits an incoming call request to an incoming-call side IP-telephone. Upon receiving the incoming call request, the IP-telephone rings. When the recipient places the IP-telephone that rings in a starting state, the call connection control unit enables a call between the two IP-telephones.

7 Claims, 10 Drawing Sheets

FIG. 8

| IP ADDRESS | TELEPHONE NUMBER |
|---|---|
| 192. 168. 2. 1 | 2001 |
| 192. 168. 2. 2 | 2002 |
| 192. 168. 3. 1 | 3001 |
| 192. 168. 3. 2 | 3002 |
| 192. 168. 4. 1 | 4001 |
| 192. 168. 4. 2 | 4002 |
| 192. 168. 5. 1 | 6316 |
| 192. 168. 5. 2 | 5815 |
| 192. 168. 5. 3 | 9002 |

CALL CONNECTION CONTROL UNIT AND CALL CONNECTION CONTROL METHOD

The present application is based on and claims priority of Japanese patent application No. 2005-259745 filed on Sep. 7, 2005, the entire contents of which are hereby incorporated by reference.

BACKGROUND OF THE INVENTION

1. Field of the Invention

The present invention relates to a telephone system that includes a telephone set, a personal computer and a call connection control unit, and more particularly to a call connection control unit for performing call connection control and a call connection control method for the call connection control unit.

2. Description of the Related Art

Conventionally, telephone numbers are input manually when making an outgoing call from a telephone. As a result, there is the problem that an input error may occur when inputting a telephone number and also that the operation to input a telephone number is troublesome.

To solve these problems, technology has been proposed that links a telephone set with a personal computer. In this case, the term "links a telephone set with a personal computer" refers to, for example, using a personal computer to input a telephone number and to originate a call to that telephone number, or receiving an incoming call on both a personal computer and a telephone set. This technology takes advantage of the good visibility of a personal computer screen and the favorable operability of input means (a keyboard or a mouse or the like).

Japanese Patent Laid-Open Publication No. 2001-127902 and Japanese Patent Laid-Open Publication No. 2004-229151 disclose technology that reduces input errors and troublesomeness by selecting a telephone number that is displayed on a personal computer that is linked to a telephone set.

However, according to the technology disclosed in Japanese Patent Laid-Open Publication No. 2001-127902, a telephone set must have a function of receiving a telephone number that is sent from a personal computer as well as a function of originating a call to the telephone number that is received from the personal computer. Commercially available telephone sets do not have such functions. Therefore, to utilize that technology it is necessary to purchase a dedicated telephone set having such functions or to modify a telephone set that is currently in use. There is thus the problems that significant costs are incurred in investing in new equipment or that a significant amount of time and labor are required in order to modify a telephone set that is currently in use.

Further, according to the technology disclosed in Japanese Patent Laid-Open Publication No. 2004-229151, it is necessary to select the telephone number of the intended calling party on the personal computer screen and thereafter independently perform an outgoing call operation from the telephone set that is linked with the personal computer. Consequently, the user must memorize which telephone set is the telephone set that is linked to the personal computer. There is thus the problem that a user may make a mistake regarding which telephone set to use, particularly in an environment in which multiple telephone sets are used. There is also a problem that this technology has poor usability in a "free seating-style office" in which the seats of workers are not fixed.

SUMMARY OF THE INVENTION

The present invention has been made in view of the above-mentioned problems, and an object thereof is to provide a call connection control method in which a conventional telephone set can be used as it is and which links a personal computer and a telephone set in a manner in which there is a low possibility of a user mistaking the telephone set, as well as a call connection control unit for implementing the method.

A call connection control unit according to a first aspect of the present invention is a unit for performing call connection control that includes means for storing a correspondence between an identifier for identifying a telephone set and an identifier for identifying a personal computer, comprising: means for, upon receiving an outgoing call request from an outgoing-call side personal computer, retrieving an outgoing-call side telephone set corresponding to the outgoing-call side personal computer from the means for storing; means for transmitting a first incoming call request to the outgoing-call side telephone set that is retrieved; means for sending a ring back tone to the outgoing-call side telephone set upon receiving a first response corresponding to the first incoming call request; means for transmitting a second incoming call request to an incoming-call side telephone set; and means for placing the outgoing-call side telephone set and the incoming-call side telephone set in a call-enabled state on receiving a second response corresponding to the second incoming call request.

According to the call connection control unit of the first aspect of the present invention, the only functions required for an outgoing-call side telephone set are an incoming call function and a phone call function. Further, since there is an incoming call at the telephone set on the outgoing-call side at the time of an outgoing call, it is possible to use a conventional telephone set as it is and link a personal computer and a telephone set in a manner in which there is a low possibility of a user mistaking the telephone set.

A call connection control unit according to a second aspect of the present invention is a unit for performing call connection control that includes means for storing a correspondence between an identifier for identifying a telephone set and an identifier for identifying a personal computer, comprising: means for, upon receiving an outgoing call request from an outgoing-call side personal computer, retrieving an outgoing-call side telephone set corresponding to the outgoing-call side personal computer from the means for storing; means for transmitting an incoming call request to the outgoing-call side telephone set that is retrieved; and means for canceling the incoming call request to the outgoing-call side telephone set upon receiving an outgoing call cancellation request from the outgoing-call side personal computer.

According to the call connection control unit of the second aspect of the present invention, an outgoing call can be cancelled from an outgoing-call side personal computer.

A call connection control method according to a third aspect of the present invention is a method that is used by a call connection control unit that includes means for storing a correspondence between an identifier for identifying a telephone set and an identifier for identifying a personal computer, comprising the steps of: upon receiving an outgoing call request from an outgoing-call side personal computer, retrieving an outgoing-call side telephone set corresponding to the outgoing-call side personal computer from the means for storing; transmitting a first incoming call request to the outgoing-call side telephone set that is retrieved; sending a ring back toner to the outgoing-call side telephone set upon receiving a first response corresponding to the first incoming call request; transmitting a second incoming call request to an incoming-call side telephone set; and placing the outgoing-call side telephone set and the incoming-call side telephone set in a call-enabled state upon receiving a second response corresponding to the second incoming call request.

According to the call connection control method of the third aspect of the present invention, the only functions required for an outgoing-call side telephone set are an incoming call function and a phone call function. Further, since there is an incoming call at the telephone set on the outgoing-call side at the time of an outgoing call, it is possible to use a conventional telephone set as it is and link a personal computer and a telephone set in a manner in which there is a low possibility of the user mistaking the telephone set.

A call connection control method according to a fourth aspect of the present invention is a method that is used by a call connection control unit that includes means for storing a correspondence between an identifier for identifying a telephone set and an identifier for identifying a personal computer, comprising the steps of: upon receiving an outgoing call request from an outgoing-call side personal computer, retrieving an outgoing-call side telephone set corresponding to the outgoing-call side personal computer from the means for storing; transmitting an incoming call request to the outgoing-call side telephone set that is retrieved; and canceling the incoming call request to the outgoing-call side telephone set upon receiving an outgoing call cancellation request from the outgoing-call side personal computer.

According to the call connection control method of the fourth aspect of the present invention, an outgoing-call can be cancelled from the outgoing-call side personal computer.

According to the present invention, it is possible to provide a call connection control method in which a conventional telephone set can be used as it is and which links a personal computer and a telephone set in a manner in which there is a low possibility of a user mistaking the telephone set, as well as a call connection control unit for implementing the method.

BRIEF DESCRIPTION OF THE DRAWINGS

FIG. 8 is an explanatory diagram of a table showing correspondences between IP addresses and telephone numbers;

DETAILED DESCRIPTION OF THE PREFERRED EMBODIMENTS

Embodiments of the present invention will now be described with reference to the attached drawings. It is to be understood that the following embodiments are merely specific examples of the present invention, and the present invention is not limited to the following embodiments.

First Embodiment

Figure 1:
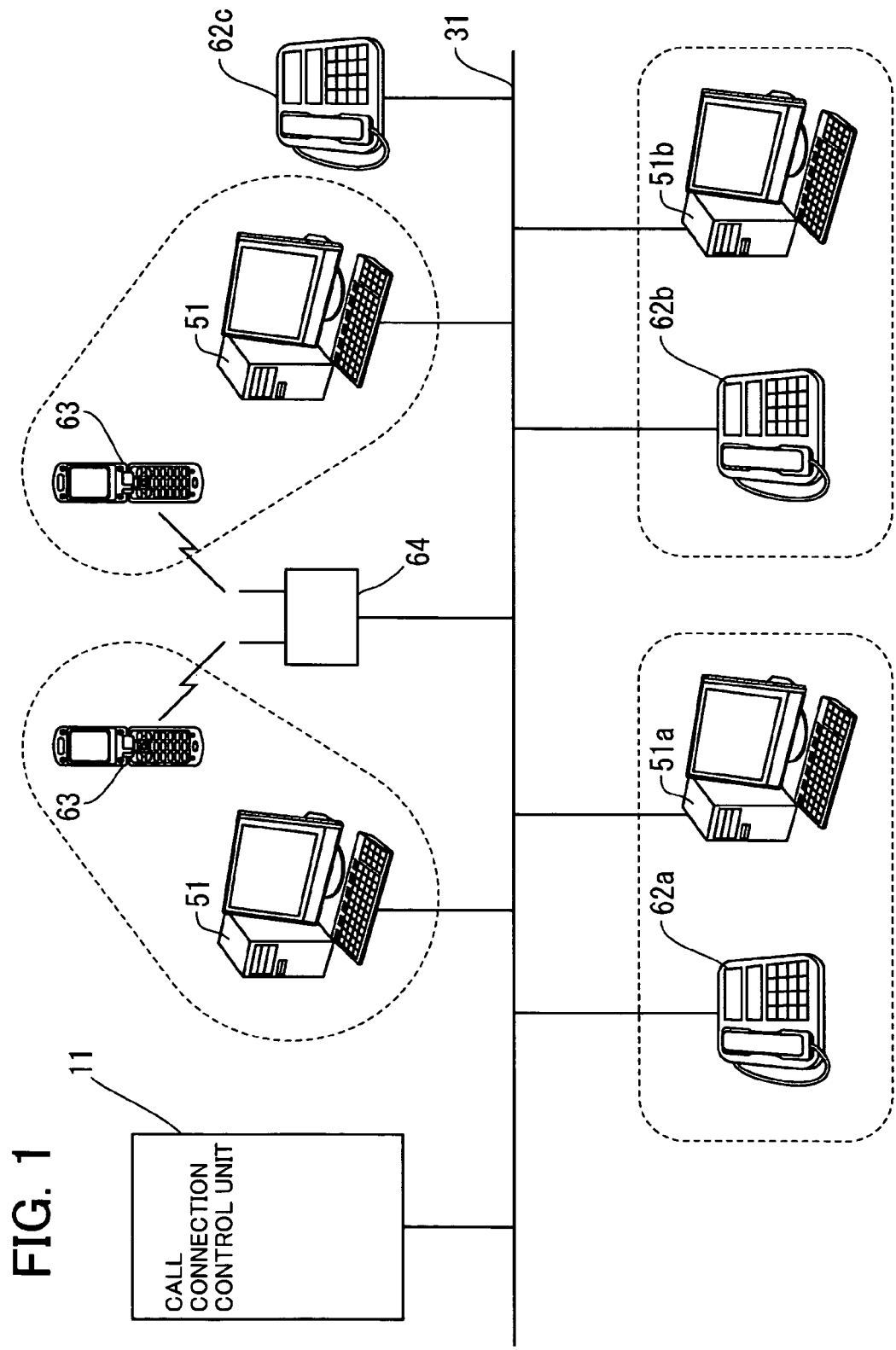
FIG. 1 is a diagram showing a configuration of a first embodiment and a fourth embodiment.

FIG. 1 is a diagram showing the configuration of a telephone system of this embodiment. The telephone system comprises a call connection control unit 11, personal computers 51, IP-telephones 62, digital cordless-phones (Personal Handyphone System terminals) 63, an Internet Protocol base station 64 and a local area network 31. The digital cordless-phones (Personal Handyphone System terminals) 63 and the Internet Protocol base station 64 are wirelessly connected. The call connection control unit 11, personal computers 51, IP-telephones 62 and Internet Protocol base station 64 are connected by the local area network 31. Each of the pair that is surrounded by a dotted line indicates the linking of a telephone set and a personal computer.

Figure 2:
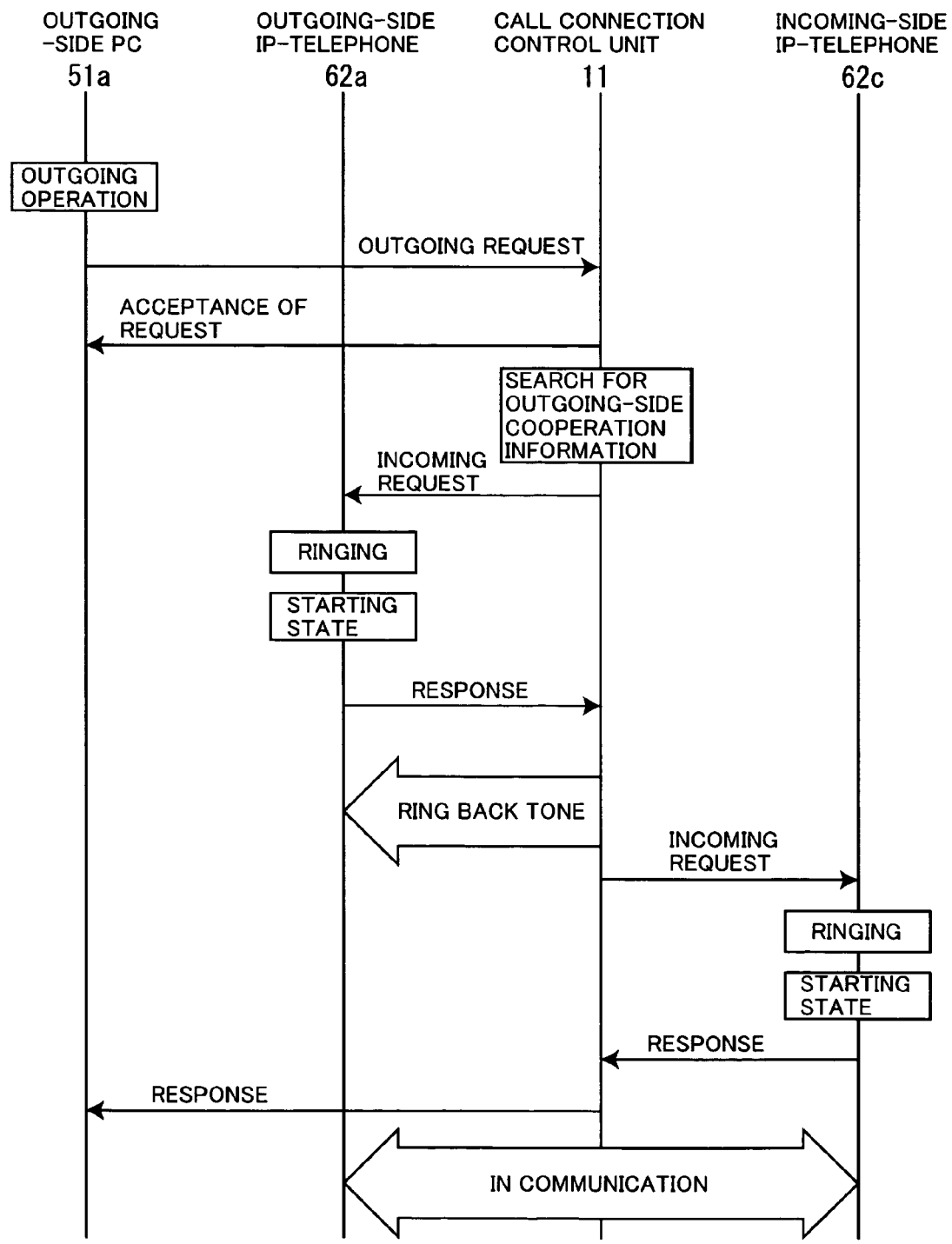
FIG. 2 is a sequence diagram showing a procedure of the first embodiment.
Figure 3:
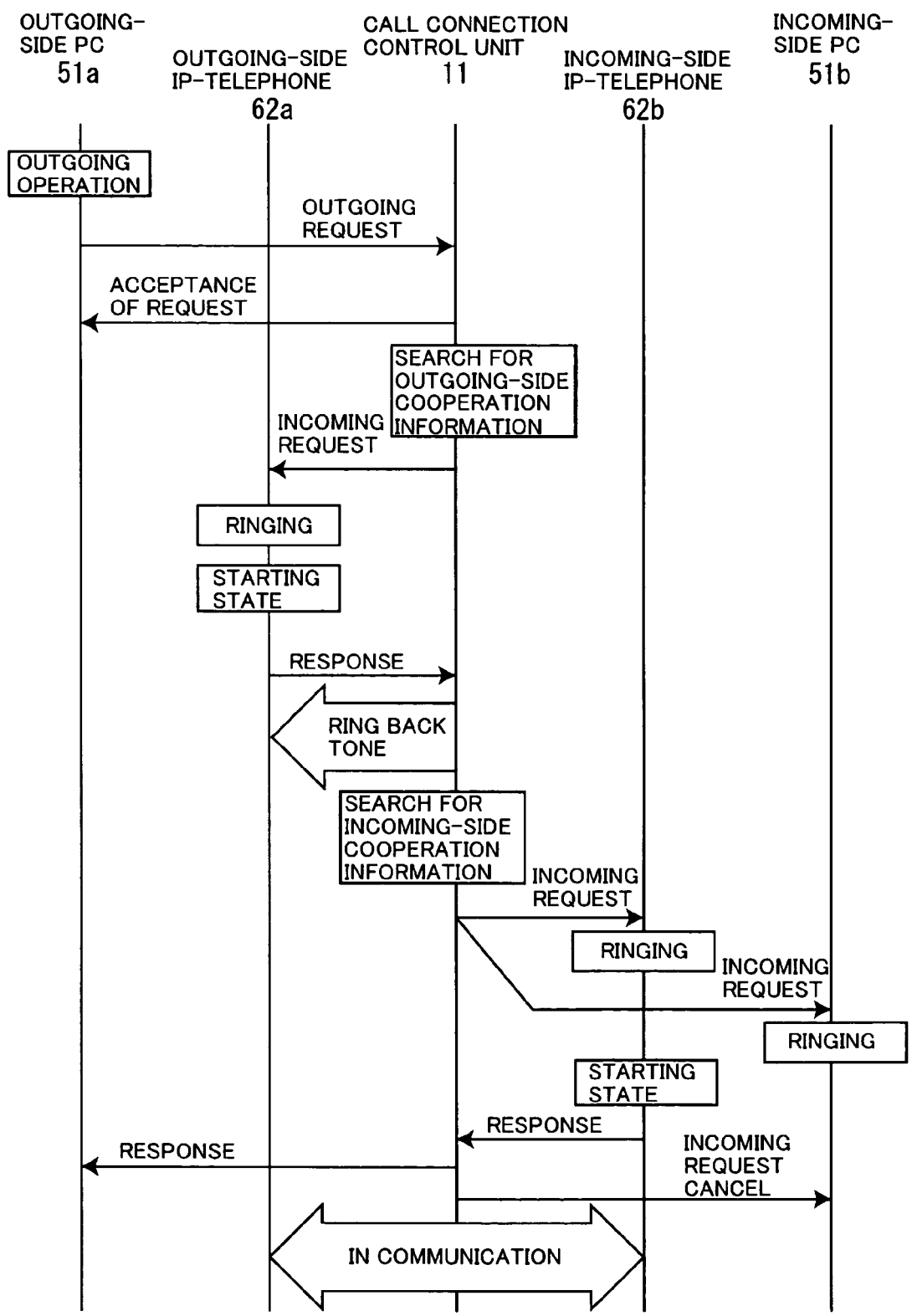
FIG. 3 is a sequence diagram showing the procedure of the first embodiment.

FIGS. 2 and 3 are sequence diagrams that illustrate a procedure of the call connection control method of this embodiment. FIG. 8 is an explanatory diagram of a table showing combinations of the IP addresses of the personal computers 51 connected to the local area network 31 and the telephone numbers of the telephone sets that are linked with the personal computers 51. This table is stored in the call connection control unit 11.

In FIG. 2, the outgoing-call side is an IP-telephone 62$a$ and a personal computer 51$a$, and the incoming-call side is an IP-telephone 62$c$ (not linked with a personal computer 51). First, a caller performs an outgoing call operation using the outgoing-call side personal computer 51$a$. As a result, the outgoing-call side personal computer 51$a$ transmits an outgoing call request to the call connection control unit 11. upon receiving the outgoing call request, the call connection control unit 11 returns a request acceptance message to the outgoing-call side personal computer 51$a$. Further, the call connection control unit 11 retrieves the outgoing-call side IP-telephone 62$a$ that is linked with the outgoing-call side personal computer 51$a$ using the table shown in FIG. 8, and then transmits an incoming call request to the aforementioned outgoing-call side IP-telephone 62$a$ that is linked with the outgoing-call side personal computer 51$a$. Upon receiving the incoming call request, the outgoing-call side IP-telephone 62$a$ sounds a ringing tone (rings). When the caller places the IP-telephone 62 (outgoing-call side IP-telephone 62$a$) that has sounded the ringing tone in a starting state (off-hook state), the outgoing-call side IP-telephone 62$a$ transmits a response to the call connection control unit 11. Upon receiving the response, the call connection control unit 11 sends a ring back tone to the outgoing-call side IP-telephone 62$a$ and also transmits an incoming call request to the incoming-call side IP-telephone 62$c$. Upon receiving the incoming call request, the incoming-call side IP-telephone 62$c$ sounds a ringing tone (rings). When the recipient of the call places the IP-telephone 62 (incoming-call side IP-telephone 62$c$) that has sounded the ringing tone in a starting state (off-hook state), the incoming-call side IP-telephone 62$c$ transmits a response to the call connection control unit 11. upon receiving the response, the call connection control unit 11 transmits a response to the outgoing-call side personal computer 51a and enables a call between the outgoing-call side IP-telephone 62a and the incoming-call side IP-telephone 62c.

In FIG. 3, the outgoing-call side is the IP-telephone 62a and the personal computer 51a, and the incoming-call side is an IP-telephone 62b and a personal computer 51b. First, the caller performs an outgoing call operation using the outgoing-call side personal computer 51a. As a result, the outgoing-call side personal computer 51a transmits an outgoing call request to the call connection control unit 11. Upon receiving the outgoing call request, the call connection control unit 11 returns a request acceptance message to the outgoing-call side personal computer 51a. Further, the call connection control unit 11 retrieves the outgoing-call side IP-telephone 62a that is linked with the outgoing-call side personal computer 51a using the table shown in FIG. 8, and then transmits an incoming call request to the aforementioned outgoing-call side IP-telephone 62a that is linked with the outgoing-call side personal computer 51a. Upon receiving the incoming call request, the outgoing-call side IP-telephone 62a sounds a ringing tone (rings). When the caller places the IP-telephone 62 (outgoing-call side IP-telephone 62a) that has sounded the ringing tone in a starting state (off-hook state), the outgoing-call side IP-telephone 62a transmits a response to the call connection control unit 11. Upon receiving the response, the call connection control unit 11 sends a ring back tone to the outgoing-call side IP-telephone 62a. Furthermore, the call connection control unit 11 retrieves the personal computer 51b that is linked with the incoming-call side IP-telephone 62b using the table shown in FIG. 8, and transmits an incoming call request to the incoming-call side IP-telephone 62b and the incoming-call side personal computer 51b. Upon receiving the incoming call request, the incoming-call side IP-telephone 62b and the incoming-call side personal computer 51b sound a ringing tone (ring). When the recipient of the call places the IP-telephone 62 (incoming-call side IP-telephone 62b) that has sounded the ringing tone in a starting state (off-hook state), the incoming-call side IP-telephone 62b transmits a response to the call connection control unit 11. Upon receiving the response from the incoming-call side IP-telephone 62b, the call connection control unit 11 transmits a response to the outgoing-call side personal computer 51a, sends request to cancel the incoming call request to the incoming-call side personal computer 51b and, enables a call between the outgoing-call side IP-telephone 62a and the incoming-call side IP-telephone 62b.

Second Embodiment

Figure 4:
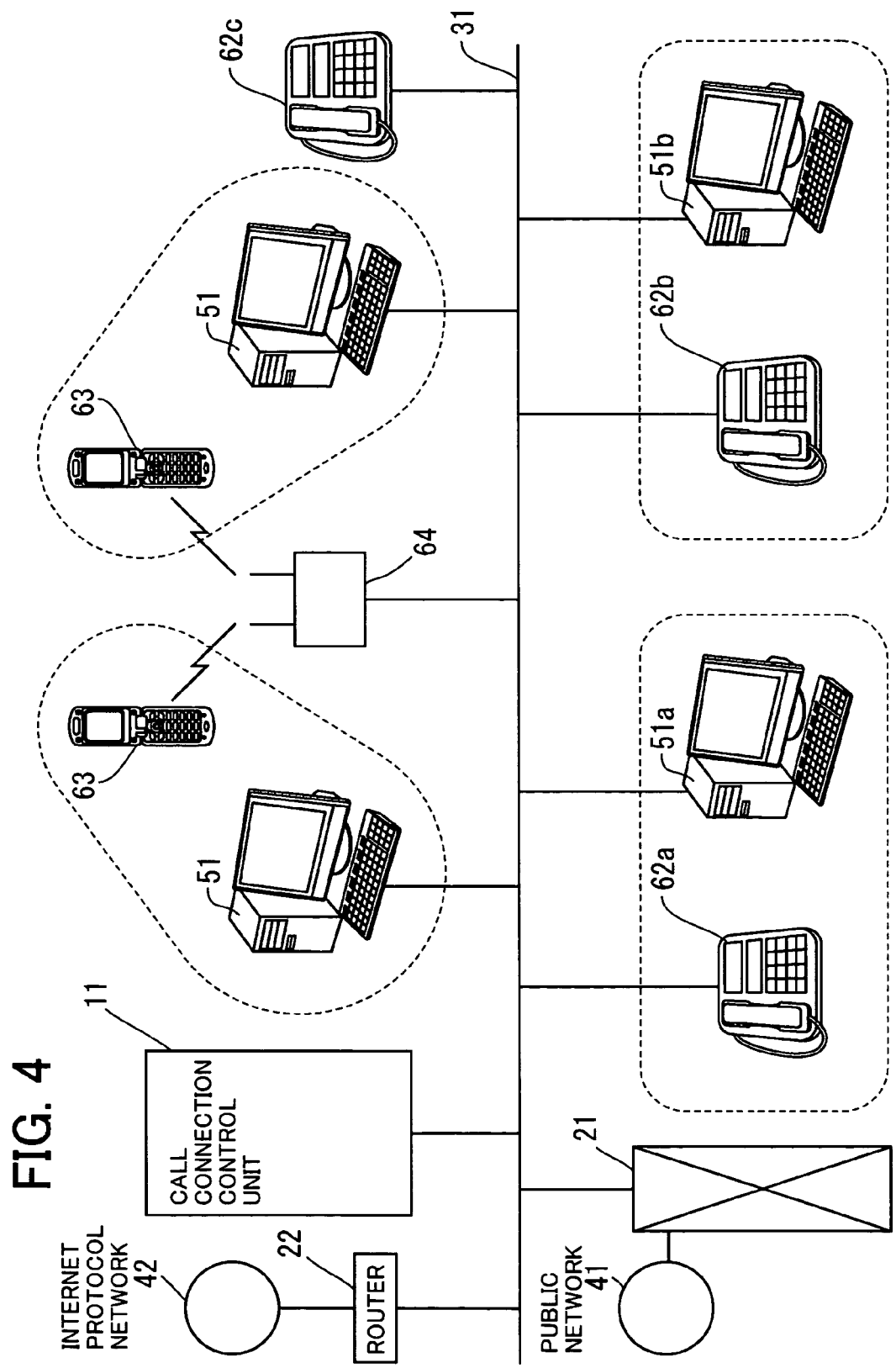
FIG. 4 is a diagram showing the configuration of a second embodiment.

FIG. 4 is a diagram showing the configuration of the telephone system of this embodiment. The telephone system comprises a call connection control unit 11, personal computers 51, IP-telephones 62, digital cordless-phones (Personal Handyphone System terminals) 63, an Internet Protocol base station 64, a local area network 31, a private branch exchange 21, and a router 22. The telephone system is connected to a public network 41 through the private branch exchange 21 and connected to an Internet Protocol network through the router 22. The digital cordless-phones (Personal Handyphone System terminals) 63 and the Internet Protocol base station 64 are wirelessly connected. The call connection control unit 11, personal computers 51, IP-telephones 62 and Internet Protocol base station 64, private branch exchange 21, and router 22 are connected by the local area network 31. Each pair that is surrounded by a dotted line indicates the linking of a telephone set and a personal computer.

Figure 5:
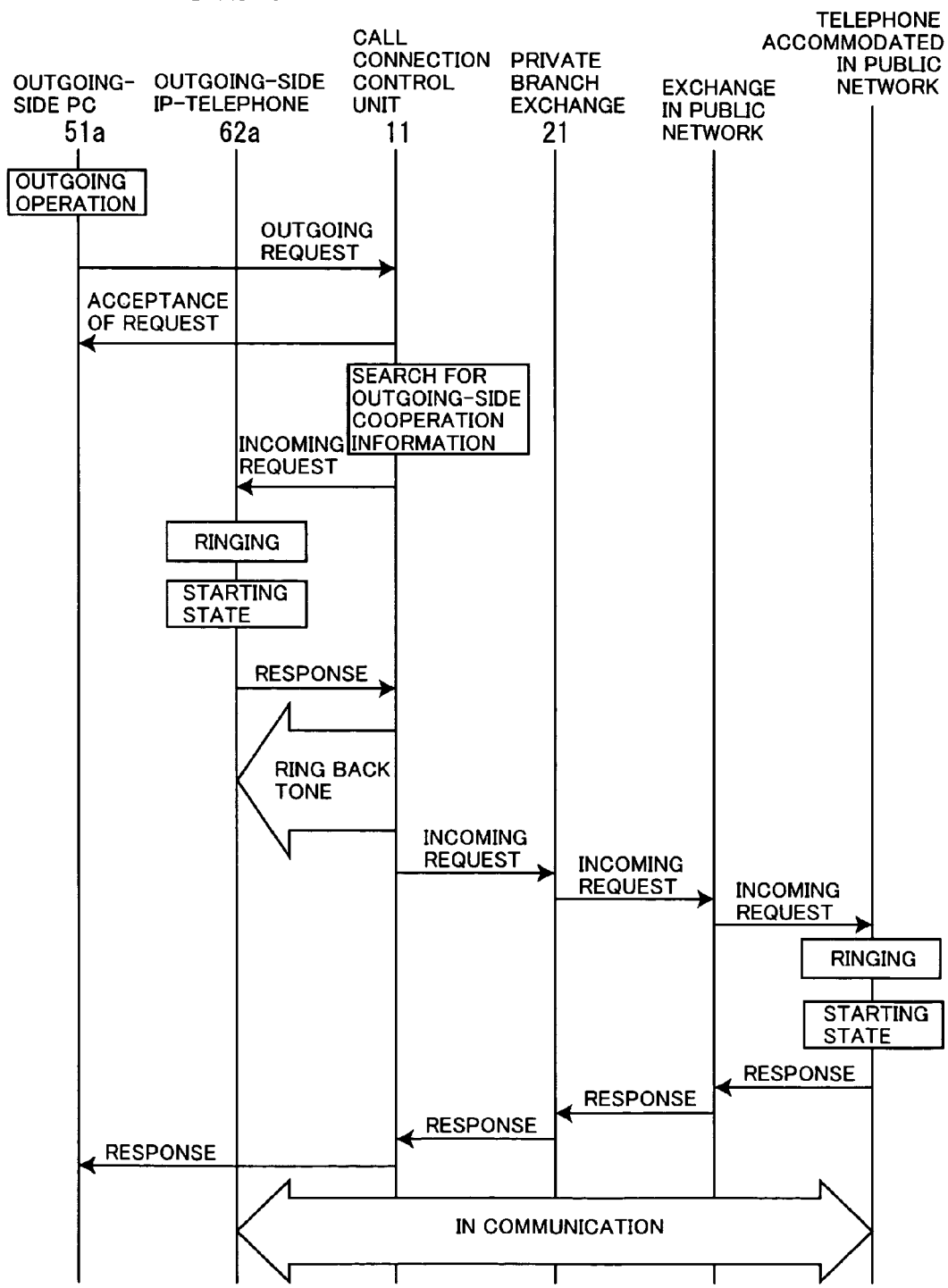
FIG. 5 is a sequence diagram showing a procedure of the second embodiment.

FIG. 5 is a sequence diagram that illustrates a procedure of the call connection control method of this embodiment. FIG. 8 is an explanatory diagram of a table showing combinations of the IP addresses of the personal computers 51 connected to the local area network 31 and the telephone numbers of the telephone sets that are linked with the personal computers 51. This table is stored in the call connection control unit 11.

In FIG. 5, the outgoing-call side is the IP-telephone 62a and the personal computer 51a, and the incoming-call side is a telephone set (a fixed-line telephone, a cellular phone or the like) that is accommodated in the public network. First, the caller performs an outgoing call operation using the outgoing-call side personal computer 51a. As a result, the outgoing-call side personal computer 51a transmits an outgoing call request to the call connection control unit 11. Upon receiving the outgoing call request, the call connection control unit 11 returns a request acceptance message to the outgoing-call side personal computer 51a. Further, the call connection control unit 11 retrieves the outgoing-call side IP-telephone 62a that is linked with the outgoing-call side personal computer 51a using the table shown in FIG. 8, and then transmits an incoming call request to the aforementioned outgoing-call side IP-telephone 62a that is linked with the outgoing-call side personal computer 51a. Upon receiving the incoming call request, the outgoing-call side IP-telephone 62a sounds a ringing tone (rings). When the caller places the IP-telephone 62 (outgoing-call side IP-telephone 62a) that has sounded the ringing tone in a starting state (off-hook state), the outgoing-call side IP-telephone 62a transmits a response to the call connection control unit 11. Upon receiving the response, the call connection control unit 11 sends a ring back tone to the outgoing-call side IP-telephone 62a and also transmits an incoming call request to the incoming-call side telephone set (telephone set accommodated in the public network). The incoming call request reaches the telephone set accommodated in the public network via the private branch exchange 21 and an exchange in the public network. Upon receiving the incoming call request, the telephone set that is accommodated in the public network sounds a ringing tone (rings). When the recipient of the call places the telephone set (telephone set accommodated in the public network) that has sounded the ringing tone in a starting state (off-hook state), the telephone set accommodated in the public network transmits a response to the call connection control unit 11. The response reaches the call connection control unit 11 via the exchange in the public network and the private branch exchange 21. Upon receiving the response, the call connection control unit 11 transmits a response to the outgoing-call side personal computer 51a and enables a call between the outgoing-call side IP-telephone 62a and the incoming-call side telephone set that is accommodated in the public network.

Third Embodiment

Figure 6:
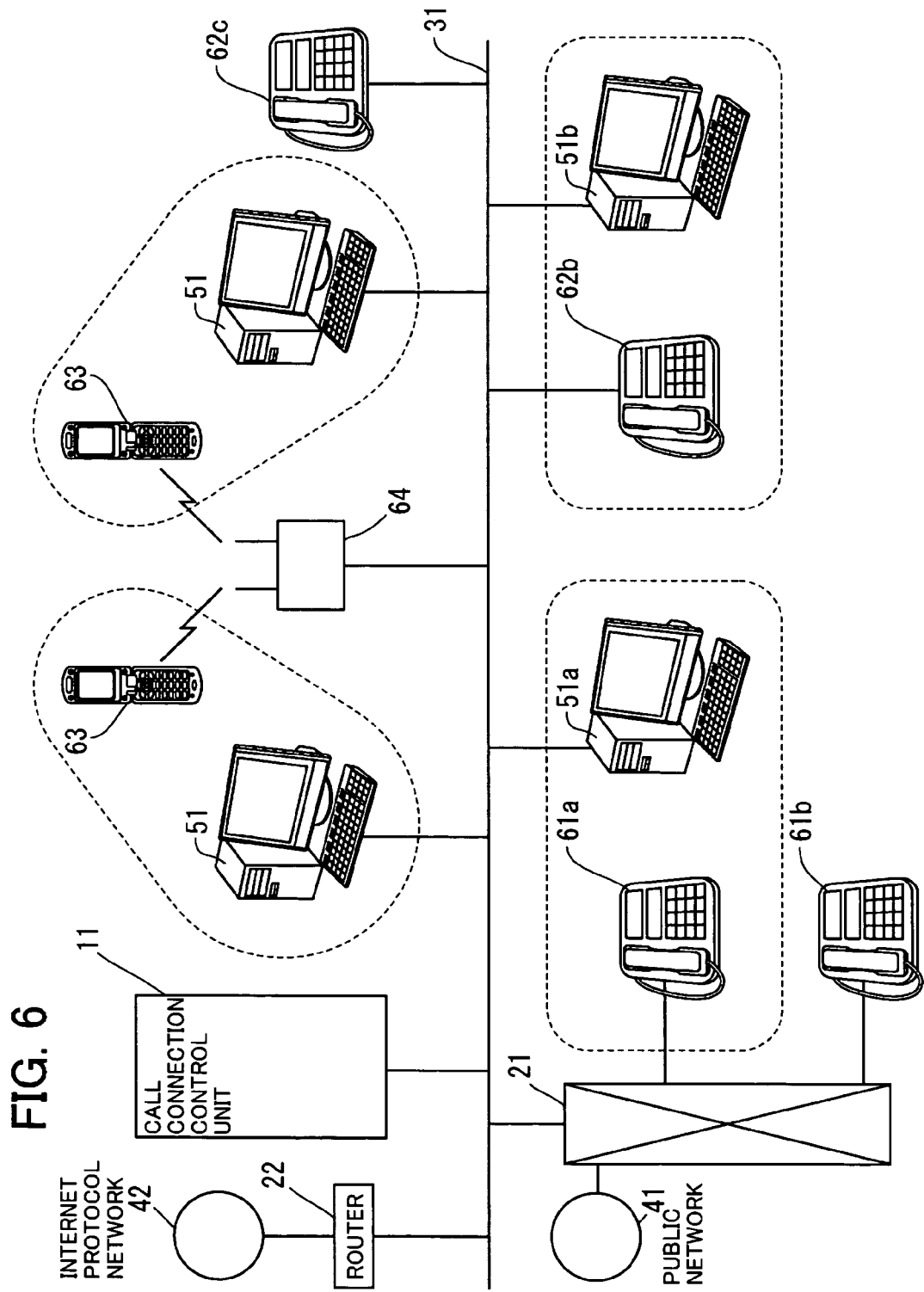
FIG. 6 is a diagram showing the configuration of a third embodiment.

FIG. 6 is a diagram showing the configuration of the telephone system of this embodiment. The telephone system comprises a call connection control unit 11, a personal computers 51, circuit switching type telephones (extension telephones) 61, IP-telephones 62, digital cordless-phones (Personal Handyphone System terminals) 63, an Internet Protocol base station 64, a local area network 31, a private branch exchange 21 and a router 22, This telephone system is connected to a public network 41 through the private branch exchange 21 and connected to an Internet Protocol network through the router 22. The digital cordless-phones (Personal Handyphone System terminals) 63 and the Internet Protocol base station 64 are wirelessly connected. The call connection control unit 11, personal computer 51, IP-telephones 62 Internet Protocol base station 64, private branch exchange 21, and router 22 are connected by the local area network 31. The circuit switching type telephones 61 are accommodated in the private branch exchange 21. Each pair surrounded by a dotted line indicates the linking of a telephone set and a personal computer.

Figure 7:
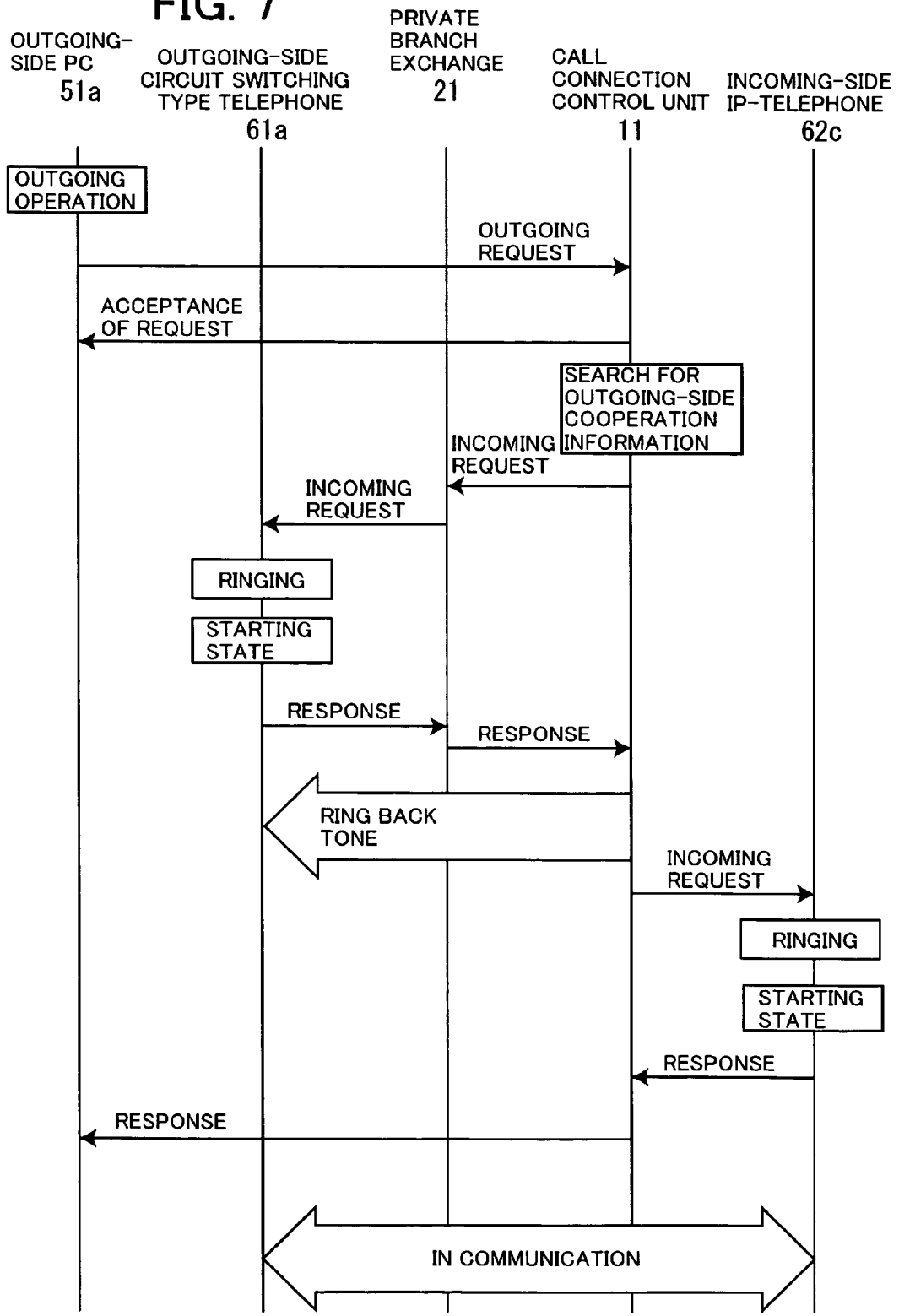
FIG. 7 is a sequence diagram showing a procedure of the third embodiment.

FIG. 7 is a sequence diagram that illustrates a procedure of the call connection control method of this embodiment. FIG. 8 is an explanatory diagram of a table showing combinations of the IP addresses of the personal computers 51 connected to the local area network 31 and the telephone numbers of the telephone sets that are linked with the personal computers 51. This table is stored in the call connection control unit 11.

In FIG. 7, the outgoing-call side is a circuit switching type telephone 61a and the personal computer 51a, and the incoming-call side is the IP-telephone 62c (not linked with a personal computer 51). First, a caller performs an outgoing call operation using the outgoing-call side personal computer 51a. As a result, the outgoing-call side personal computer 51a transmits an outgoing call request to the call connection control unit 11. Upon receiving the outgoing call request, the call connection control unit 11 returns a request acceptance message to the outgoing-call side personal computer 51a. Further, the call connection control unit 11 retrieves the outgoing-call side circuit switching type telephone 61a that is linked with the outgoing-call side personal computer 51a using the table shown in FIG. 8, and then transmits an incoming call request to the aforementioned outgoing-call side circuit switching type telephone 61a that is linked with the outgoing-call side personal computer 51a. The incoming call request reaches the outgoing-call side circuit switching type telephone 61a via the private branch exchange 21 that accommodates the outgoing-call side circuit switching type telephone 61a. Upon receiving the incoming call request, the outgoing-call side circuit switching type telephone 61a sounds a ringing tone (rings). When the caller places the telephone set (outgoing-call side circuit switching type telephone 61a) that has sounded the ringing tone in a starting state (off-hook state), the outgoing-call side circuit switching type telephone 61a transmits a response to the call connection control unit 11. The response reaches the call connection control unit 11 via the private branch exchange 21. Upon receiving the response, the call connection control unit 11 sends a ring back tone to the outgoing-call side circuit switching type telephone 61a and also transmits an incoming call request to the incoming-call side IP-telephone 62c. Upon receiving the incoming call request, the incoming-call side IP-telephone 62c sounds a ringing tone (rings). When the recipient of the call places the IP-telephone 62 (incoming-call side IP-telephone 62c) that has sounded the ringing tone in a starting state (off-hook state), the incoming-call side IP-telephone 62c transmits a response to the call connection control unit 11. Upon receiving the response, the call connection control unit 11 transmits a response to the outgoing-call side personal computer 51a and enables a call between the outgoing-call side circuit switching type telephone 61a and the incoming-call side IP-telephone 62c.

Fourth Embodiment

FIG. 1 is a diagram showing the configuration of the telephone system of this embodiment. The telephone system comprises a call connection control unit 11, personal computers 51, IP-telephones 62, digital cordless-phones (Personal Handyphone System terminals) 63, an Internet Protocol base station 64, and a local area network 31. The digital cordless-phones (Personal Handyphone System terminals) 63 and the Internet Protocol base station 64 are wirelessly connected. The call connection control unit 11, personal computers 51, IP-telephones 62 and Internet Protocol base station 64 are connected by the local area network 31. Each pair that is surrounded by a dotted line indicates the linking of a telephone set and a personal computer.

Figure 9:
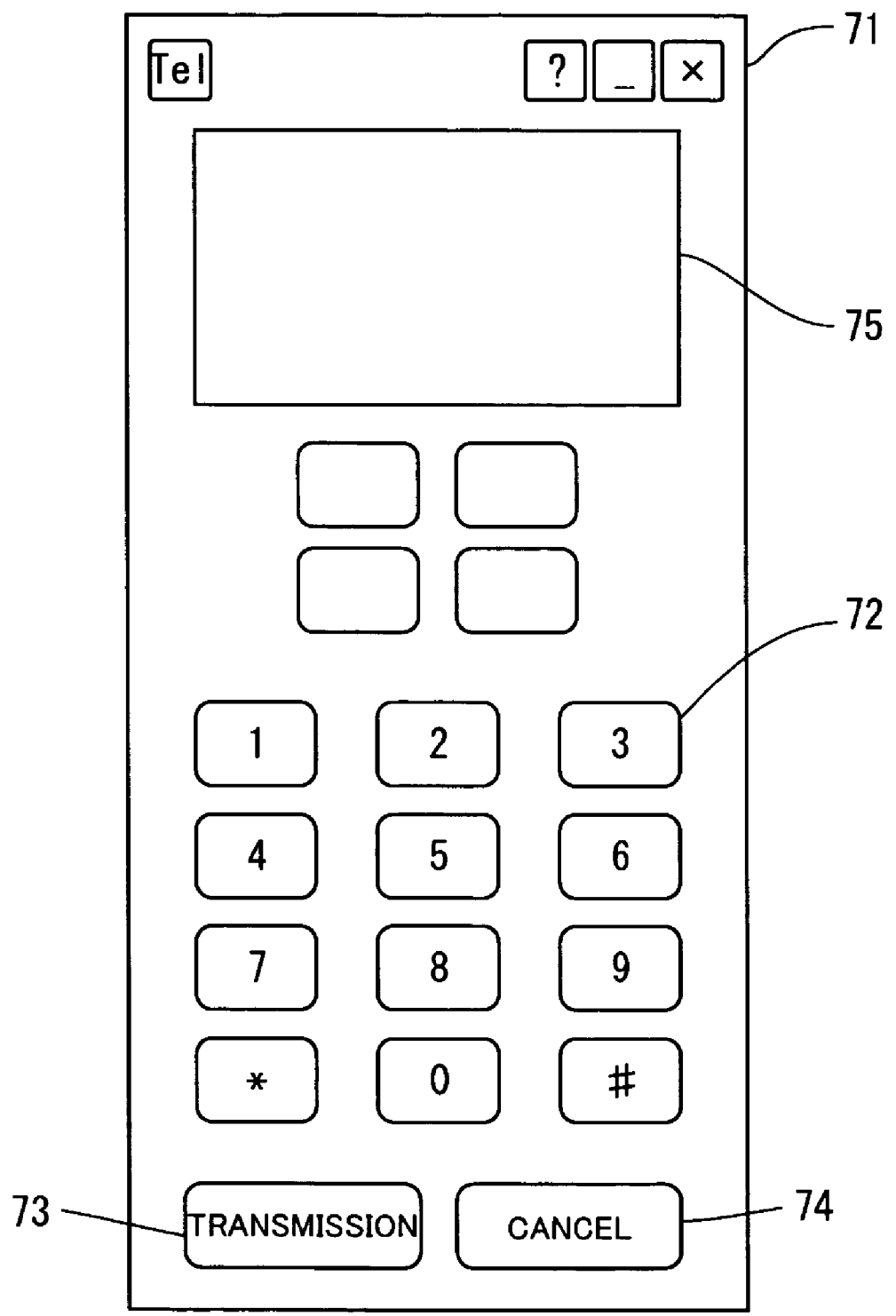
FIG. 9 is a diagram showing a telephone set displayed on a screen of a personal computer.
Figure 10:
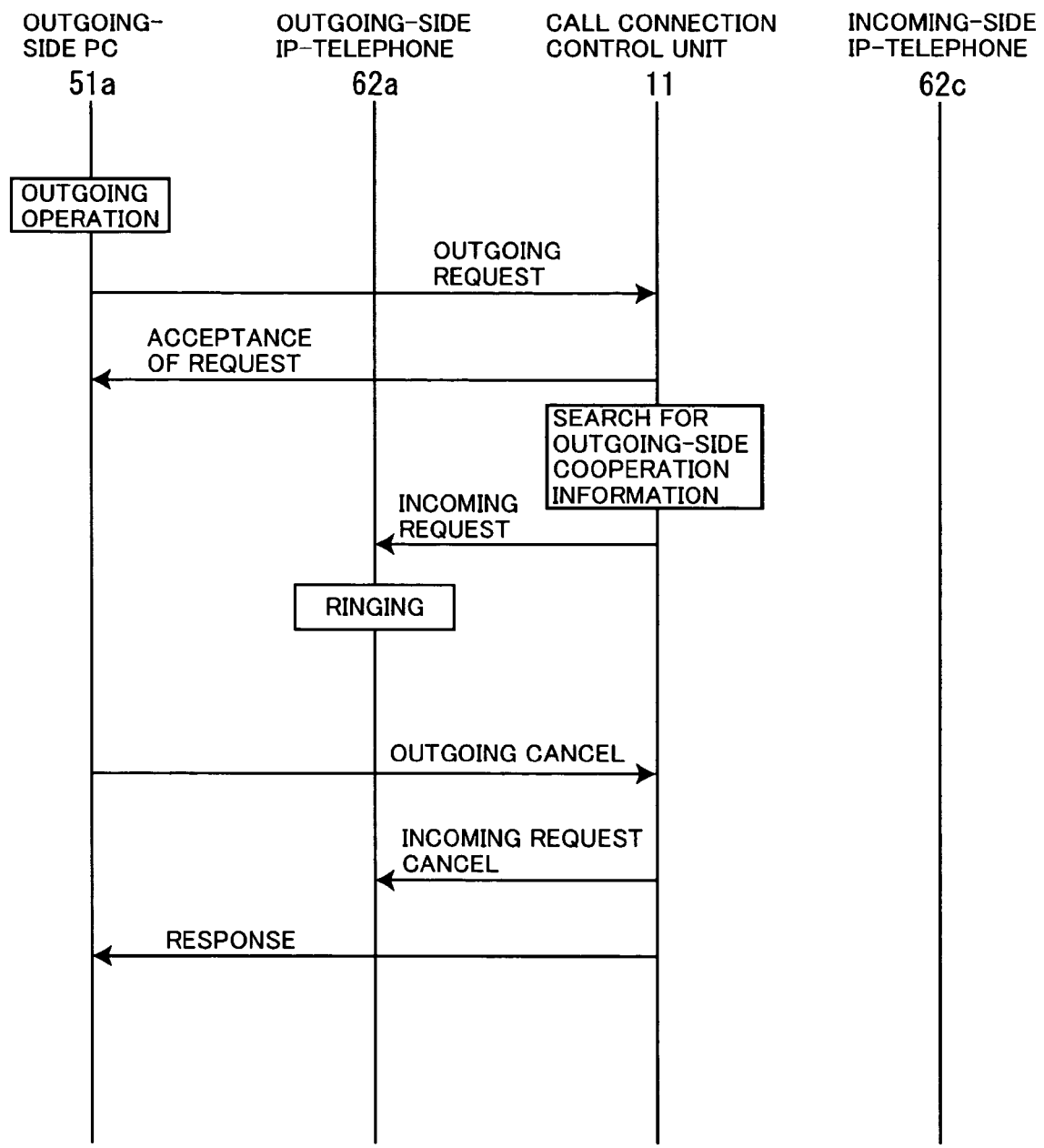
FIG. 10 is a sequence diagram in the case of cancelling an outgoing call.

FIG. 10 is a sequence diagram that illustrates a procedure to cancel an outgoing call according to this embodiment. FIG. 8 is an explanatory diagram of a table showing combinations of the IP addresses of the personal computers 51 connected to the local area network 31 and the telephone numbers of the telephone sets that are linked with the personal computers 51. This table is stored in the call connection control unit 11. FIG. 9 is a diagram that illustrates a telephone set that is displayed on the screen of a personal computer 51. A user can move a pointer (arrow) of a mouse onto a button of this display of a telephone set (FIG. 9), and press the button by clicking thereon.

In FIG. 10, the outgoing-call side is the IP-telephone 62a and the personal computer 51a, and the incoming-call side is the IP-telephone 62c (not linked with the personal computer 51). First, a caller performs an outgoing call operation using the outgoing-call side personal computer 51a. As a result, the outgoing-call side personal computer 51a transmits an outgoing call request to the call connection control unit 11. Upon receiving the outgoing call request, the call connection control unit 11 returns a request acceptance message to the outgoing-call side personal computer 51a. Furthermore, the call connection control unit 11 retrieves the outgoing-call side IP-telephone 62a that is linked with the outgoing-call side personal computer 51a using the table shown in FIG. 8, and then transmits an incoming call request to the aforementioned outgoing-call side IP-telephone 62a that is linked with the outgoing-call side personal computer 51a. Upon receiving the incoming call request, the outgoing-call side IP-telephone 62a sounds a ringing tone (rings). If the caller wants to cancel the outgoing call at this time, the caller presses (clicks on with the mouse) a cancel button 74 of the telephone set shown in FIG. 9. As a result, the outgoing-call side personal computer 51a transmits an outgoing call cancellation request to the call connection control unit 11. Upon receiving the outgoing call cancellation request, the call connection control unit 11 transmits an outgoing call cancellation request to the outgoing-call side IP-telephone 62a, and also transmits a response to the outgoing-call side personal computer 51a.

Thus, it is possible to link an outgoing-call side telephone set with a personal computer 51 using only the functions that the telephone set is normally equipped with (an incoming call function and a phone call function). Further, since the outgoing-call side telephone set rings at the time of an outgoing call so that the telephone set can be identified, the possibility of a user mistaking the telephone set can be reduced. Furthermore, an outgoing call can be canceled from the outgoing-call side personal computer 51.

According to the foregoing embodiments, the outgoing-call side telephone sets are the IP-telephones 62 and the circuit switching type telephones 61. However, the digital cordless-phones (Personal Handyphone System terminals) 63 may also be used as outgoing-call side telephone sets.

What is claimed is:

1. A call-connection control unit for exerting call-connection control for personal computers connected on a same local area network (LAN) as the call-connection control unit, the call-connection control unit comprising:

correspondence means for storing entries pairing a correspondence between an identifier for identifying a telephone and an identifier for identifying a personal computer designated to handle call-connection operations of the telephone, for each of a plurality of telephones and personal computers which have been paired with each other;

searching means for, on receiving an outgoing call-connection request from an outgoing-side personal computer connected on the LAN, using the entries to search for an outgoing-side telephone of the plurality of telephones, corresponding to the outgoing-side personal computer;

means for transmitting a first incoming call-connection request to the outgoing-side telephone:

means for transmitting a second incoming call-connection request, responsive to receiving a predetermined first response back from the outgoing-side telephone in response to the first incoming call-connection request, to an incoming-side telephone which is a target of the outgoing call-connection request; and means for putting the outgoing-side telephone and the incoming-side telephone in a telephone call-enabled state responsive to receiving a predetermined second response back from the incoming-side telephone in response to the second incoming call-connection request.

2. A call-connection control unit for exerting call-connection control for personal computers connected on a same local area network (LAN) as the call-connection control unit, the call-connection control unit comprising:

correspondence means for storing entries pairing a correspondence between an identifier for identifying a telephone and an identifier for identifying a personal computer designated to handle call-connection operations of the telephone, for each of a plurality of telephones and personal computers which have been paired with each other;

searching means for, on receiving an outgoing call-connection request from an outgoing-side personal computer connected on the LAN, using the entries to search for an outgoing-side telephone of the plurality of telephones, corresponding to the outgoing-side personal computer;

means for transmitting an incoming call-connection request to the outgoing-side telephone:

means for canceling the incoming call-connection request to the outgoing-side telephone responsive to receiving an outgoing cancel from the outgoing-side personal computer.

3. A call-collection control method executed via a call-connection control unit for exerting call-connection control for personal computers connected on a same local area network (LAN) as a unit effecting the call-connection control method, the call-connection control method comprising:

storing entries pairing a correspondence between an identifier for identifying a telephone and an identifier for identifying a personal computer designated to handle call-connection operations of the telephone, for each of a plurality of telephones and personal computers which have been paired with each other;

on receiving an outgoing call-connection request from an outgoing-side personal computer connected on the LAN, using the entries to search for an outgoing-side telephone of the plurality of telephones, corresponding to the outgoing-side personal computer;

transmitting a first incoming call-connection request to the outgoing-side telephone:

transmitting a second incoming call-connection request, responsive to receiving a predetermined first response back from the outgoing-side telephone in response to the first incoming call-connection request, to an incoming-side telephone which is a target of the outgoing call-connection request; and putting the outgoing-side telephone and the incoming-side telephone in a telephone call-enabled state responsive to receiving a predetermined second response back from the incoming-side telephone in response to the second incoming call-connection request.

4. A call-collection control method executed via a call-connection control unit for exerting call-connection control for personal computers connected on a same local area network (LAN) as a unit effecting the call-connection control method, the call-connection control method comprising:

storing entries pairing a correspondence between an identifier for identifying a telephone and an identifier for identifying a personal computer designated to handle call-connection operations of the telephone, for each of a plurality of telephones and personal computers which have been paired with each other;

on receiving an outgoing call-connection request from an outgoing-side personal computer connected on the LAN, using the entries to search for an outgoing-side telephone of the plurality of telephones, corresponding to the outgoing-side personal computer;

transmitting an incoming call-connection request to the outgoing-side telephone:

canceling the incoming call-connection request to the outgoing-side telephone responsive to receiving an outgoing cancel from the outgoing-side personal computer.

5. A call-connection control unit for exerting call-connection control for personal computers connected on a same local area network (LAN) as the call-connection control unit, the call-connection control unit comprising:

a correspondence storage configured to store entries pairing a correspondence between an identifier for identifying a telephone and an identifier for identifying a personal computer designated to handle call-connection operations of the telephone, for each of a plurality of telephones and personal computers which have been paired with each other;

a searching device configured to, on receiving an outgoing call-connection request from an outgoing-side personal computer connected on the LAN, use the entries to search for an outgoing-side telephone of the plurality of telephones, corresponding to the outgoing-side personal computer;

a transmitter configured to transmit a first incoming request to the outgoing-side telephone:

a ring-back device configured to send out a ring-back tone to the outgoing-side telephone, responsive to receiving a predetermined first response back from the outgoing-side telephone in response to the first incoming request;

a transmitter configured to transmit a second incoming request to an incoming-side telephone which is a target of the outgoing call-connection request; and a call-enabling device configured to put the outgoing-side telephone and the incoming-side telephone in a telephone call-enabled state responsive to receiving a predetermined second response back from the incoming-side telephone in response to the second incoming request.

6. A call-connection control unit for exerting call-connection control for personal computers connected on a same local area network (LAN) as the call-connection control unit, the call-connection control unit comprising:

a correspondence storage configured to store entries pairing a correspondence between an identifier for identifying a telephone and an identifier for identifying a personal computer designated to handle call-connection operations of the telephone, for each of a plurality of telephones and personal computers which have been paired with each other;

a searching device configured to, on receiving an outgoing call-connection request from an outgoing-side personal computer connected on the LAN, use the entries to search for an outgoing-side telephone of the plurality of telephones, corresponding to the outgoing-side personal computer;

a transmitter configured to transmit a first incoming request to the outgoing-side telephone:

a cancelling device configured to cancel the incoming request to the outgoing-side telephone responsive to receiving an outgoing cancel from the outgoing-side personal computer.

7. A call-connection control unit for exerting call-connection and call-disconnection control for personal computers connected on a same local area network (LAN) as the call-connection control unit, the call-connection control unit comprising:

correspondence means for storing entries pairing a correspondence between an identifier for identifying a telephone and an identifier for identifying a personal computer designated to handle call-connection operations of the telephone, for each of a plurality of telephones and personal computers which have been paired with each other;

searching means for, on receiving an outgoing call-connection request from an outgoing-side personal computer connected on the LAN, using the entries to search for an outgoing-side telephone of the plurality of telephones, corresponding to the outgoing-side personal computer;

means for transmitting a first incoming call-connection request to the outgoing-side telephone:

means for transmitting a second incoming call-connection request, responsive to receiving a predetermined first response back from the outgoing-side telephone in response to the first incoming call-connection request, to an incoming-side telephone which is a target of the outgoing call-connection request;

means for putting the outgoing-side telephone and the incoming-side telephone in a telephone call-enabled state responsive to receiving a predetermined second response back from the incoming-side telephone in response to the second incoming call-connection request; and disconnection means for, on receiving an outgoing call-disconnection request from the outgoing side personal computer, transmitting a call-disconnection request to the outgoing-side telephone.

* * * * *

UNITED STATES PATENT AND TRADEMARK OFFICE
CERTIFICATE OF CORRECTION

PATENT NO. : 7,796,741 B2  Page 1 of 1
APPLICATION NO. : 11/516606
DATED : September 14, 2010
INVENTOR(S) : Urayama et al.

It is certified that error appears in the above-identified patent and that said Letters Patent is hereby corrected as shown below:

Please replace Item (73) with the following:

(73)    Hitachi, Ltd., Tokyo (JP)

Signed and Sealed this
Twenty-fourth Day of April, 2012

David J. Kappos
*Director of the United States Patent and Trademark Office*